(12) United States Patent
Huang

(10) Patent No.: US 8,115,972 B2
(45) Date of Patent: Feb. 14, 2012

(54) COLOR SCANNING

(75) Inventor: Chingchu Huang, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1294 days.

(21) Appl. No.: 11/807,869

(22) Filed: May 30, 2007

(65) Prior Publication Data

US 2008/0297860 A1     Dec. 4, 2008

(51) Int. Cl.
*H04N 1/04* (2006.01)

(52) U.S. Cl. ......... 358/474; 358/497; 358/486; 358/488

(58) Field of Classification Search ................ 358/474, 358/497, 486, 488, 482

See application file for complete search history.

(56) References Cited

U.S. PATENT DOCUMENTS

| | | | |
|---|---|---|---|
| 4,467,348 A | | 8/1984 | Fujii et al. |
| 4,638,372 A | | 1/1987 | Leng et al. |
| 5,650,863 A | * | 7/1997 | Utagawa et al. ............ 358/475 |
| 5,991,055 A | | 11/1999 | Haselby et al. |
| 6,650,441 B1 | * | 11/2003 | Horigome et al. ........... 358/474 |
| 6,650,442 B1 | * | 11/2003 | Chiu ............................ 358/474 |
| 6,655,784 B2 | | 12/2003 | Kakutani |
| 6,937,369 B2 | * | 8/2005 | Shih et al. .................... 358/486 |
| 2002/0181759 A1 | * | 12/2002 | Yamaguchi .................. 382/149 |
| 2005/0213167 A1 | * | 9/2005 | Shiraishi ...................... 358/474 |

FOREIGN PATENT DOCUMENTS

| | | |
|---|---|---|
| JP | 360021670 | 2/1985 |
| JP | 360024763 | 2/1985 |

* cited by examiner

*Primary Examiner* — Houshang Safaipour

(57) ABSTRACT

Among various embodiments of the present disclosure, image scanning can be performed by scanning an object in a forward direction and capturing a first image of the object, scanning the object in a reverse direction and capturing a second image of the object, and combining the first image and the second image to produce a single image.

11 Claims, 6 Drawing Sheets

COLOR SCANNING

INTRODUCTION

A scanning apparatus can accomplish improved color reproduction by capturing more than one image of each object serving as a scan target and combining the images to form a single image. Using a light source having a different optical spectrum for capturing each image can contribute to such improved color reproduction.

However, for instance, scanning a scan target twice to capture two images may take around double the time used for a single scan. In addition, alignment of more than one image using instructions executable to form the single image may be complicated by factors such as variance in product manufacturing tolerances, variation in start position of each scan, mechanical vibration associated with a scan carriage, etc.

DETAILED DESCRIPTION

Figure 1:
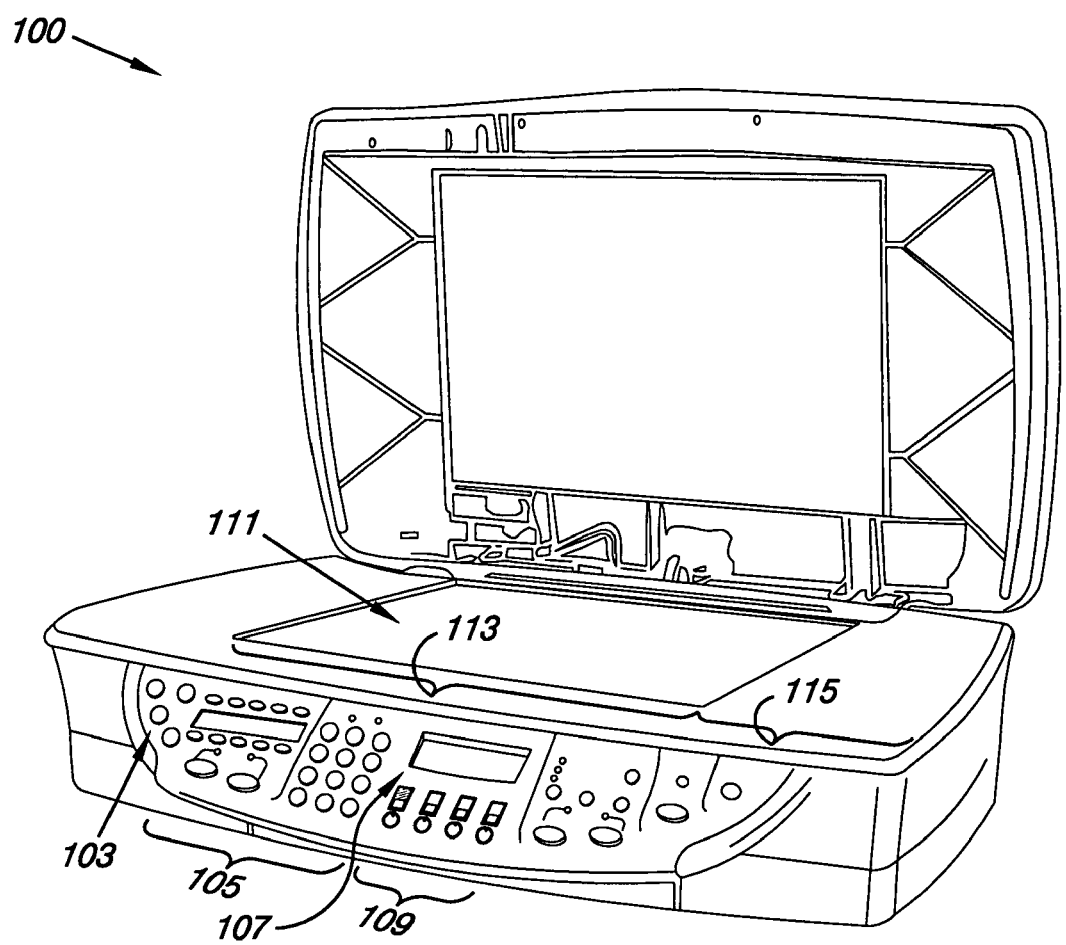
FIG. 1 illustrates an example scanning apparatus suitable to implement embodiments of the present disclosure.

Various embodiments of the present disclosure can be performed with a scanning apparatus to accomplish image reproduction by moving a scan carriage from a home position in a forward direction to locate a first reference mark before capturing a first image of an object placed on a scan window. In general, a scan carriage can be located within a scanning apparatus and the scan carriage can include one or more light sources for illumination during transit of an object associated with a scan window. Light can be reflected and/or transmitted by the object through the scan window and detected by a number of photosensitive elements (e.g., sensors) associated with the scan carriages in order to capture an image.

In embodiments of the present disclosure, after capturing the first image, the scan carriage can be moved in a reverse direction to locate a second reference mark before capturing a second image of the object. As such, capturing an image in a forward scan and an image in a reverse scan to be combined into a single image can be performed in around half the time used by two scans that each start from the home position.

The locations of the first and second reference marks in a coordinate system relative to the object can be used in execution of instructions to align the first image and the second image. As such, contribution of factors affecting alignment can be reduced (e.g., variance in product manufacturing tolerances, variation in start position of each scan, and/or mechanical vibration associated with a scan carriage, among others).

In addition, in some embodiments of the present disclosure, one or more light sources emitting a first optical spectrum can be used for the scan in the forward direction from a home position and one or more light sources emitting a second optical spectrum that is different from the first optical spectrum can be used for the scan in the reverse direction. As such, color reproduction can be achieved in an image with two scans of the object using two different color spectra in less time than would be used in two scans starting from the same home position.

Accordingly, among various embodiments of the present disclosure, image scanning can be performed by scanning an object in a forward direction, capturing a first image of the object, subsequently scanning the object in a reverse direction, and capturing a second image of the object. In various embodiments, instructions can be executed to combine the first image and the second image to produce a single image.

Scanning the object in the forward direction can be performed using at least one light source emitting a characteristic first optical spectrum for illuminating the object. In some embodiments, scanning the object in the reverse direction can be performed using at least one light source emitting a characteristic second optical spectrum for illuminating the object, where the characteristic second optical spectrum differs from the characteristic first optical spectrum. Such multiple spectrum scans can improve color reproduction in a combined image by allowing detection of more wavelength peaks and/or ranges reflected/transmitted by the object being scanned.

FIG. 1 illustrates an example scanning apparatus suitable to implement embodiments of the present disclosure. The embodiment of FIG. 1 illustrates an image scanning apparatus 100 that can, in various embodiments, be connected to a number of remote devices to form an image scanning system. Remote devices can include, for example, computing devices such as one or more desktop computers, laptop computers, and/or workstations, among other types of devices.

In some embodiments, the image scanning apparatus 100 can be included as part of, or connected to form, a multifunctional system including more than one function mode, such as scanning, copying, faxing, and/or printing. Such a system can include, in various locations within scanning apparatus 100, one or more processors and/or application modules suitable for executing instructions (e.g., software, firmware, and/or logic-oriented circuits) and can include, in various locations, one or more memory devices. The image scanning system that includes the image scanning apparatus 100 can include one or more of the embodiments described herein.

The embodiment of FIG. 1 illustrates an image scanning apparatus 100 that includes one or more control keys 103 that can control on/off status, sleep status, and/or function mode, among other activities. The image scanning apparatus 100 can include one or more display screens with a number of associated user input interfaces 105 that can be used, for example, in assigning a label to an image being scanned.

The image scanning apparatus 100 also can include one or more scan mode display screens 107. In some embodiments, the display screens can display information using LCD graphics, among other display types. Scan mode selectors 109 can be used for control of the scan operation functionalities described below.

The embodiment of the image scanning apparatus 100 illustrated in FIG. 1 includes a scan window 111 that can, in various embodiments, be formed from any suitable wavelength transparent, semi-transparent, or translucent material that allows throughput of illuminating and/or reflected light. The scan window 111 can have various geometric formats of various sizes (e.g., squares, rectangles, circles, ovals, trapezoids, etc.) to accommodate particular objects to be associated therewith and scanned therethrough. Although the scan window 111 is usually referred to in the singular in the present disclosure, some embodiments can have more than one scan window to enable use of various configurations of arrays of multiple scan carriages.

In various embodiments, the one or more scan carriages described in the present disclosure can be located within the housing of the image scanning apparatus 100 and the scan carriages can be associated with one or more light sources (e.g., incandescent lamps, fluorescent lamps, and/or light emitting diodes (LEDs)) for illumination of an object (not shown) laid on or placed above the scan window 111. Light can be reflected by the object back through the scan window 111 and detected by a number of photosensitive elements (e.g., sensors) associated with the scan carriages.

As shown in the embodiment illustrated in FIG. 1, an image scanning apparatus 100 as described in the present disclosure can have a section of the housing 115 on one or more edge of the scan window 111 with a volume capable of containing the scan carriages. The one or more sections of housing 115 can allow the scan carriages to begin and end passage across a scan field (not shown) having a perimeter outside of the scan window 111, including regions adjacent (e.g., region 113) to the scan window 111 and regions at the end of movement (e.g., region 115) of the one or more scan carriages. As utilized in the present disclosure, the scan field can include any area capable of being detected by sensors associated with the scan carriages (e.g., the scan window 111 and/or the surrounding perimeter having markings as described below, among other detectable components).

In various embodiments of the present disclosure, markings of various types (e.g., for use as position reference marks, and calibration markers for scanning and/or imaging, among other uses) can be provided in various positions in association with the scan field. As such, markings detectable by one or more sensors associated with the scan carriages can be positioned within the scan window 111 and/or associated with the perimeter of the scan window 113 and/or the housing 115 outside the scan window 111.

Figure 2:
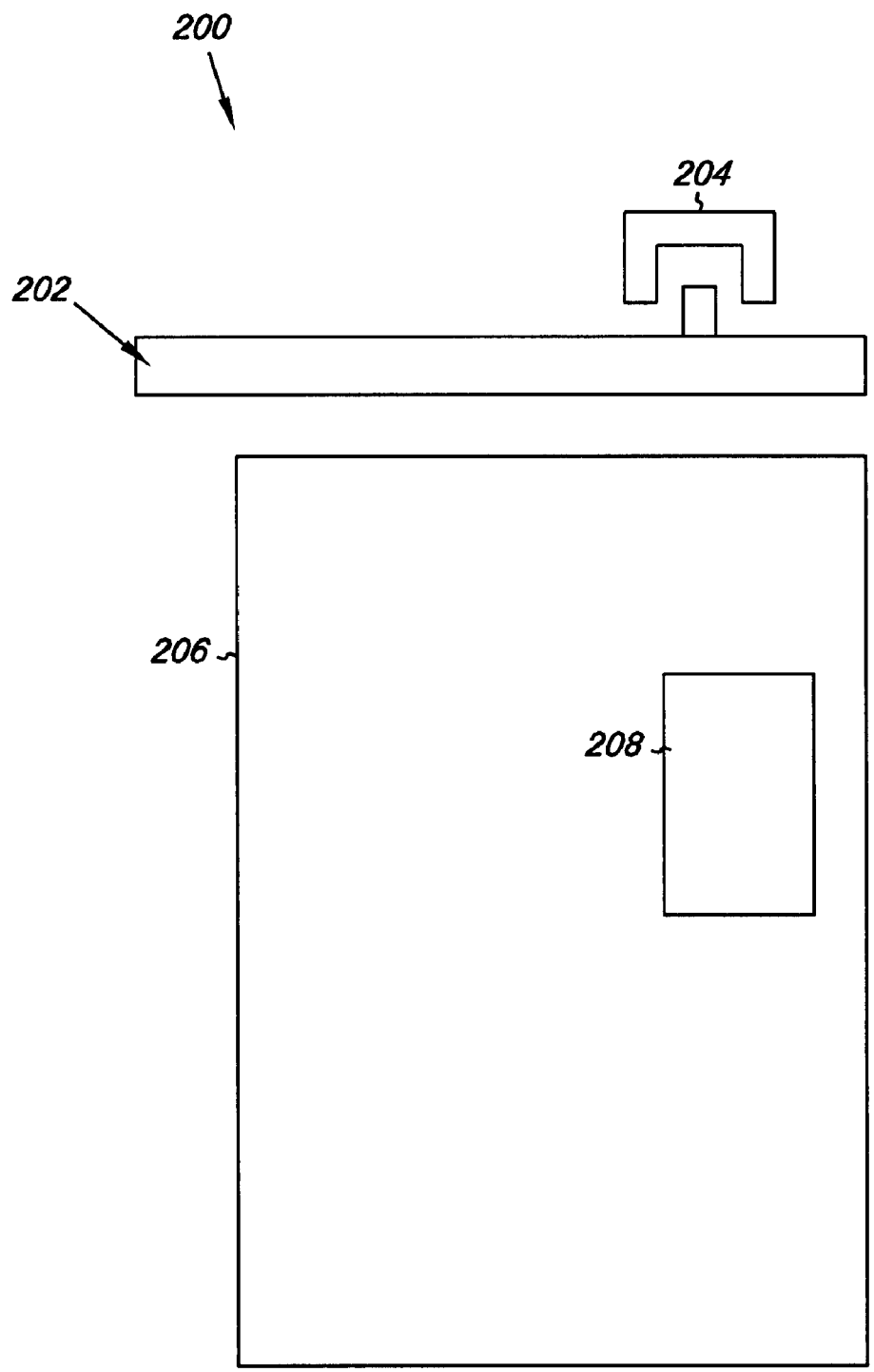
FIG. 2 illustrates an embodiment of prior art hardware includable in an apparatus, such as the scanning apparatus of FIG. 1, used to perform a scan of an object.

FIG. 2 illustrates an example of prior art hardware that can be included in an apparatus, such as the scanning apparatus of FIG. 1, used to perform a scan of an object. Scanning apparatuses can be used in a wide variety of settings, including residential and office settings, to capture electronic images of documents and objects.

Scanning apparatuses may operate by moving the scan carriage into and out of a home position. The home position of a scanning apparatus is a resting position to which the scan carriage can return between scans (e.g., after one scan of an object and before another scan of the object).

During a scan operation with existing scanning apparatus, a scan carriage may move from the home position to detect a suitable marker in order to perform a dark and/or white calibration, and may move back to the home position if the remaining distance is not enough to bring the scan carriage up to a proper speed before commencing a scan of the object. The scan carriage then can move to the object (i.e., scan target) on the scan window to start the scan and to capture an image thereof.

The scan carriage may return to the home position after performing the scan and may remain there awaiting the next scan to capture another image. Scanning apparatuses may use the data from each scan to create an electronic file of the image.

The scan hardware 200 illustrated in FIG. 2 represents the hardware configuration for a scanning apparatus that is not utilized in embodiments of the present disclosure. The scan hardware 200 illustrated in FIG. 2 includes a scan carriage 202, a home position 204 for the scan carriage 202, and a scan window 206.

The home position 204 may be where the scan carriage 202 is located when the scan carriage is not being used. In addition, the scan carriage 202 may return to the home position 204 after each scan and before beginning another scan.

The scan carriage 202 can be used to capture an image of an object 208 placed on the scan window 206. The scan carriage 202 can capture the image of the object 208 placed on the scan window 206 through use of various configurations of components that can include any number of mirrors, lenses, filters, light sources, and/or sensors (e.g., charge coupled devices (CCD), and contact image sensors (CIS), among other components).

In a scanning operation using the scan hardware of the prior art shown in FIG. 2, the object 208 may be placed on the scan window 206. The starting location of the scan can be positioned in various manners. For example, the starting location of the scan may depend on where the object 208 is placed on the scan window 206.

In some implementations, the scan starting location may be where components associated with the scan carriage 202 begin the process of capturing an image of the object 208. The scan starting location also can be selected manually, through the use of a mouse, a display, and a low resolution scan of the object 208, or automatically by a processor and/or other logic that executes instructions to select the scan starting location.

In some implementations, the scan carriage 202 may start from the home position 204, conduct a dark and/or white calibration, move to the scan starting location, and then capture an image of the object 208. The scan carriage 202 may then return to the home position before moving to perform the next scan.

Figure 3:
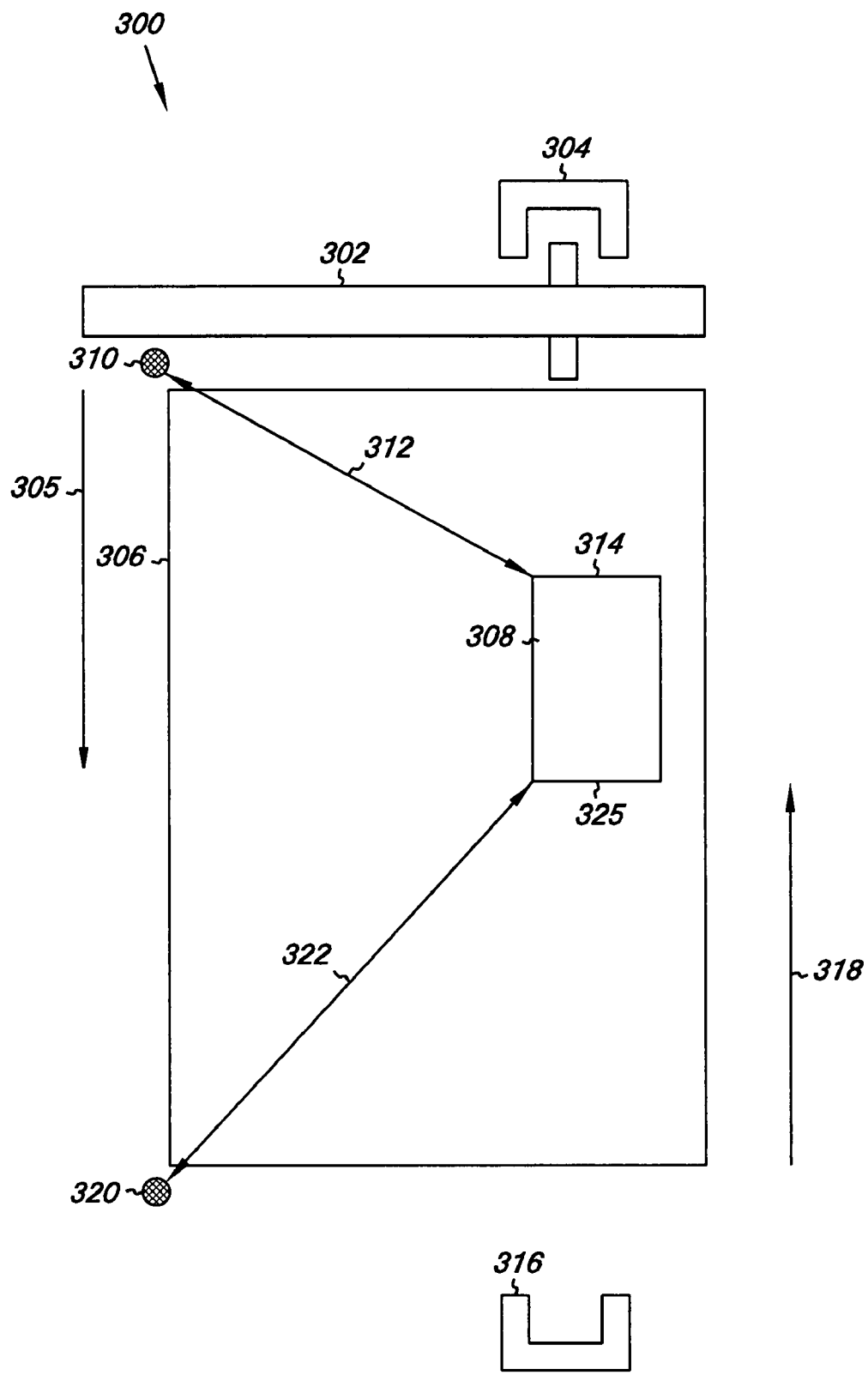
FIG. 3 illustrates an embodiment according to the present disclosure of scan hardware includable in an apparatus, such as the scanning apparatus of FIG. 1, used to perform two scans of an object.

FIG. 3 illustrates an embodiment according to the present disclosure of scan hardware includable in an apparatus, such as the scanning apparatus of FIG. 1, used to perform two scans of an object. In various embodiments of the present disclosure, the images from two scans can be combined to create a single image.

In order to achieve quality color reproduction when combining images to create a single image, the data from the two scan images must be aligned precisely. The alignment can be difficult to achieve for a number of reasons, including those described above. The present disclosure includes method and apparatus embodiments that can allow alignment of the image data from two images captured by the scan carriage despite the scan carriage starting movement from one or more home positions that can have imprecise coordinates relative to the scan target.

The scan hardware 300 illustrated in FIG. 3 shows a hardware configuration for a scanning apparatus that can include various embodiments of the present disclosure. The scan hardware 300 illustrated in FIG. 3 includes a scan carriage 302, a first home position 304 for the scan carriage 302, a direction 305 in which the scan carriage is movable from the first home position 304 (which in the present disclosure is termed a "forward direction"), and a scan window 306. A first reference mark 310 can, in various embodiments, be located within the boundary of the scan window 306 or outside the boundary in association with the scan field, as described with regard to FIG. 1.

As illustrated in FIG. 3, the first home position 304 can be a position where the scan carriage 302 is located when the scan carriage is at rest and/or between a forward image scan and a reverse image scan, as described in further detail below. The scan carriage 302 (along with associated hardware, firmware, and/or software) can be used to capture an image of an object 308 serving as a scan target placed in association with the scan window 306. The scan carriage 302 can capture images of the object 308 placed in association with the scan window 306 through use of various configurations of components that can include any number of mirrors, lenses, filters, light sources, and/or sensors (e.g., charge coupled devices (CCD), and contact image sensors (CIS), among other components).

In scanning operations implementing embodiments of the present disclosure, the object 308 can be placed on the scan window 306. The scan operation can begin with the scan carriage 302 leaving the first home position 304 and moving in the forward direction 305. Moving the scan carriage 302 in the forward direction 305 can allow detecting and locating the first reference mark 310, where the first reference mark 310 defines a first reference position in a coordinate system.

In various embodiments, the coordinate system can include a number of spatial positioning markers (e.g., in a punctual, rectilinear, and/or radial array, among others) for defining positions in the scan field. Defining such positions in the coordinate system with regard to detection of one or more reference marks can enable measurement of a distance between reference marks and another detected position in the coordinate system, for example. Such measurement can be performed by one or more logic-oriented circuits and/or application modules suitable for executing appropriate instructions (e.g., software, firmware, and/or processors).

After defining the location of the first reference mark 310 as the first reference position in the coordinate system, the scan carriage 302 can be moved in the forward direction 305 from the first reference mark 310 to a starting position 314 of a first scan of the object 308. The first scan of the object 308 can enable capturing a first image of the object 308 by moving the scan carriage 302 from the starting position of the first scan 314 to an end position beyond the object 308. In some embodiments, a second home position 316 can serve as the end position beyond the object 308.

Following capture of the first image of the object 308 and movement of the scan carriage 302 to the end position (e.g., the second home position 316) beyond the object 308, the scan carriage 302 can be moved in a reverse direction 318 to locate a second reference mark 320, where the second reference mark 320 can be used to define a second reference position in the coordinate system. After defining the location of the second reference mark 320 as the second reference position in the coordinate system, the scan carriage 302 can be moved in the reverse direction 318 from the second reference mark 320 to a starting position 325 of a second scan of the object 308. The second scan of the object 308 can enable capturing a second image of the object 308 by moving the scan carriage 302 from the starting position of the second scan 325 to an end position that, in various embodiments, can be beyond the first reference mark 310 and/or at the first home position 304.

Various embodiments of the present disclosure can use any combination of software, firmware, hardware, and/or application-specific integrated circuits (ASICs) for combining the first captured image of the object 308 with the second captured image of the object 308 to produce a single image. Combining the first and the second captured images can be performed (e.g., by a processor) using executable instructions for aligning the first and the second captured images using the location of the first reference mark 310 and the location of the second reference mark 320 in the coordinate system relative to the starting positions of the first and the second scans 314, 325 of the object 308.

The starting positions of the first and second scans 314, 325 of the object 308 can be determined by the selected placement of the object 308 on the scan window 306. The scan carriage 302 can start from the home position 304 and locate the first reference mark 310.

The first reference mark 310 can, in some embodiments, be located by using a computer-readable medium having executable instructions stored thereon for execution by a processor that, for example, uses a smoothing filter and/or edge information to define the location of a reference mark with a particular accuracy. The center of the reference mark 310, for example, can be found by using the weighted sum of the edge image of the reference mark 310. The defined location of the first reference mark 310 can be used as the first reference of a coordinate system to enable measurement of a distance 312 from the first reference mark 310 to a starting position of the first scan 314 of the object 308 and/or each data point therein.

A scanning apparatus of the present disclosure can, in various embodiments, have one or more calibration markers association with the first end of the scan field that are detectable by a sensor associated with the scan carriage 302 prior to capturing the first image of the object 308. The calibration markers can be used for calibrating a variety of system parameters, some of which can be related to appearance and/or quality of reproduction of captured images. For example, one or more calibration markers can be used for calibrating a lightness level in a captured image, a darkness level in the captured image, and/or factors related to luminance, hue, and/or saturation of colors in the captured image, among other parameters.

Calibration can be performed before, substantially simultaneously with, or after the location of the first reference mark 310 is defined. In such embodiments, after the calibration is completed and the location of the first reference mark 310 is defined, the scan carriage 302 can move to the starting location of the first scan 314 to capture a first image of the object 308. After completing the first scan of object 308, the scan carriage 302 can, for example, move to the second home position 316 and then start moving in a reverse direction 318 to perform a second scan of object 308 using the same process.

In some embodiments, one or more calibration markers also can be associated with the second end of the scan field so as to be detectable by a sensor associated with the scan carriage 302 before, substantially simultaneously with, or after the location of the second reference mark 320 is defined. In various embodiments, one or more of the same sensors or one or more different sensors can be used to detect the calibration markers at the first and second ends of the scan field and/or detect and define the location of the first and/or second reference markers 310, 320.

The first reference mark 310 can be used as the first reference in the scan field coordinate system to enable measurement of a distance to the starting position for the first scan 314 of the object 308, which also can serve as a distance to an ending position of the second scan of the object 308. Similarly, the second reference mark 320 can be used as the second reference in the scan field coordinate system to enable measurement of a distance 322 to the starting position for the second scan 325 of the object 308, which also can serve as a distance to an ending position of the first scan of the object 308.

Using such measured distances relative to the defined position of the first reference marker 310 serving as the first reference position and the defined position of the second reference marker 320 serving as the second reference position in the defined scan field coordinate system can, for example, enable alignment of the image data points. As such, the image data points from the first scan and the image data points from the second scan can be combined to form a single, new image of the object 308 with color reproduction that is improved relative to either the first or second scan images individually, in many instances.

The alignment in the present disclosure provided by location of a first reference mark 314 by a sensor on the scan carriage 302 serving as a first reference in a defined scan field coordinate system and location of a second reference mark 325 by, for example, the same sensor on the scan carriage 302 serving as a second reference in the scan field coordinate system can enable desired positional accuracy in a scan image formed from the first and second scans of the object. For a scan reproduction of a given object, this scan process can reduce or remove error caused by imprecision in the scan hardware by having distances to a scan target placed on a scan window measured from fixed reference marks, which can, in addition to improving color reproduction, provide alignment for desired sharpness and definition in the reproduced image. For example, embodiments of the present disclosure can be used to increase the accuracy of the location of a scan carriage in relation to a scan target to 0.01 millimeter (mm) at 600 pixels per inch (ppi) for a forward and reverse two scan sequence.

Accordingly, a scanning apparatus of the present disclosure can, in various embodiments, include a scan carriage movable across a scan field in a forward direction from a first end to a second end and in a reverse direction from the second end to the first end. A first reference mark can be located in a first defined position in association with the first end of the scan field and a second reference mark can be located in a second defined position in association with the second end of the scan field.

The scan carriage can include one or more sensors to locate the first reference mark and can be movable to capture a first image of an object starting at a starting position of a first scan of the object while moving across the scan field in the forward direction. The scan carriage also can include a sensor to locate the second reference mark and can be movable to capture a second image of the object starting at a starting position of a second scan of the object while moving across the scan field in the reverse direction. In various embodiments, the apparatus can include a processing device that aligns and combines data of the first and the second captured images by using the location of the first reference mark with respect to a location of the first image and the location of the second reference mark with respect to a location of the second image in a defined coordinate system.

Figure 4:
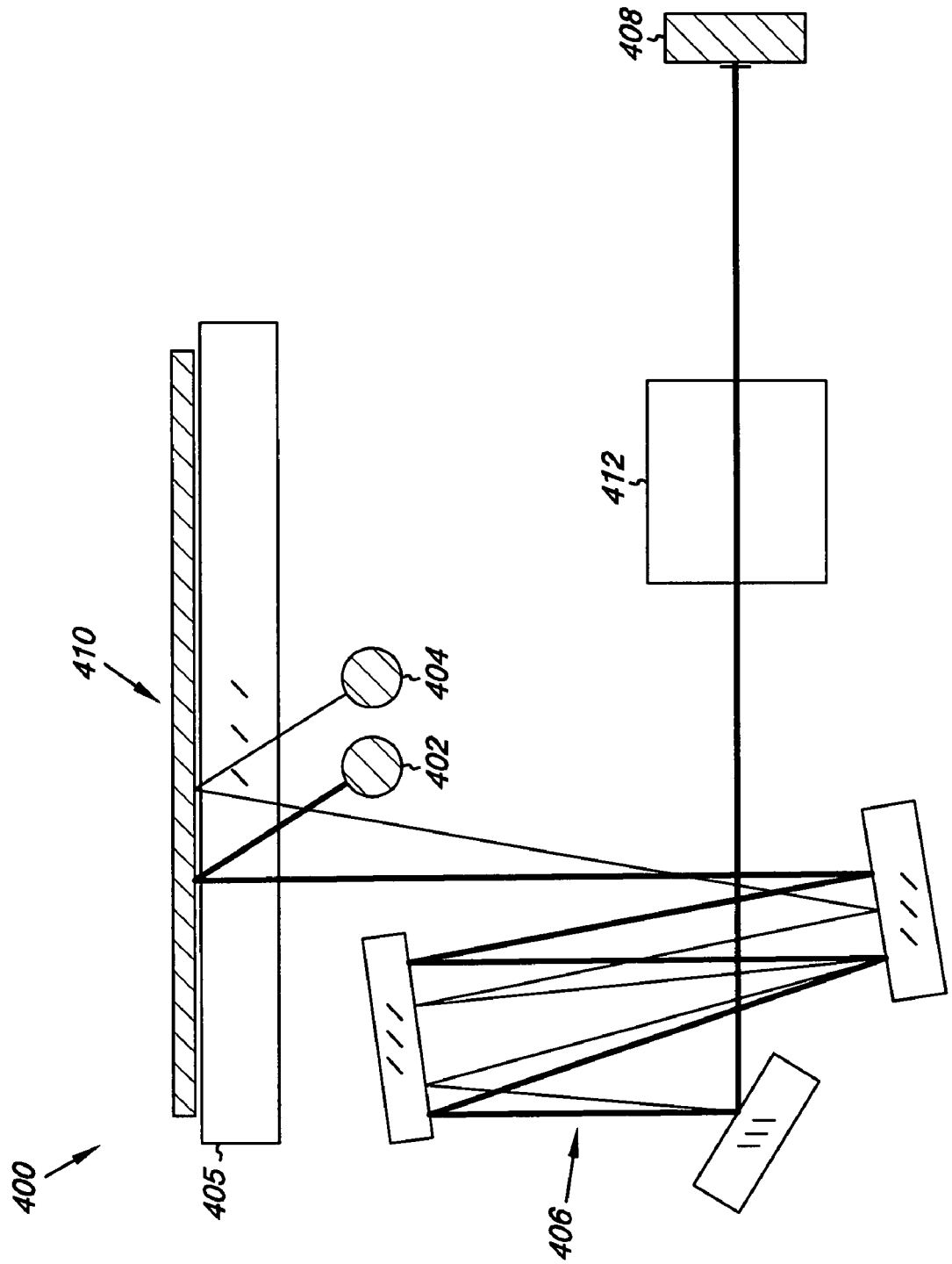
FIG. 4 illustrates an embodiment according to the present disclosure of scan hardware includable in an apparatus in which two different light sources are used to perform two scans of an object.

FIG. 4 illustrates an embodiment according to the present disclosure of scan hardware includable in an apparatus in which two different light sources are used to perform two scans of an object. Light sources 402, 404 are depicted as being utilized in performing a scan through a scan window 405 of an object 410.

Scanning apparatuses are capable of achieving better color accuracy by scanning each scan target twice, each time with a light source (e.g., an incandescent lamp, a fluorescent lamp, and/or one or more LEDs) emitting a different optical spectrum that is characteristic of the light source. As used in the present disclosure, "characteristic" denotes a trait(s) of light emitted by a light source (e.g., a lamp), or a set of light sources (e.g., a number of LEDs), that can be used to distinguish one light source and/or set of light source from another light source and/or set of light sources. Such characteristic traits can be, for example, a particular range of emitted wavelengths, a distinctive intensity of emitted light in a particular wavelength range, and a number of defined wavelength peaks, among others, that can be used to distinguish a first light source and/or set of light sources from a second light source and/or set of light sources.

Light sources that differ in characteristic spectra emitted can be used to illuminate a scan target to obtain reflected light having correspondingly distinguishable characteristics. After capturing two images each using a light source with a characteristic spectrum, the images can be combined using instructions (e.g., storable in a memory and executable by a processor) executed to enable improved color reproduction relative to single scan techniques.

The scanning apparatus hardware 400 illustrated in FIG. 4 can perform two scans, each capturing an image of the object. One of the two light sources, for example light source 402, can be used while performing a first scan of the object 410 associated with the scan window 405 and the light source not used in the first scan, for example light source 404, can be used while performing a second scan of the object 410. The two images can then be combined by, for example, the process described above with regard to FIG. 3.

The light sources 402, 404 can, in some embodiments, be connected to the same drive train components in association with a scan carriage (not shown), along with the same folded optics and/or mirrors 406 and a number of sensors 408 (e.g., three rows of RGB CCD elements). Both light sources 402, 404 can be translated across the scan window 405 and the scan target 410 together.

Light sources 402, 404 can be displaced from one another by a small distance and/or can extend across the width of a scanning apparatus or a portion thereof. For example, light sources can extend across the scan field in order to ensure that all material placed on the scan window 405 and associated with the perimeter can be sufficiently illuminated.

The object 410 can be scanned at least once in the forward and reverse directions by transiting individually illuminated light sources 402, 404 across the scan window 405 with which the object 410 is associated. The forward and reverse scans can occur at different times and/or speeds. In some embodiments, a portion of the object 410 to be scanned first can be illuminated with one light source (e.g., 402) and then the other light source (e.g., 404).

Image data representing a captured image can be generated using light reflected from or transmitted through the object 410, depending on the particular configuration of the scanning apparatus. The data can be generated using the sensor(s) 408 (e.g., CCDs, CMOS elements, and/or an area image sensor, among other image sensor elements) that are operable to generate image data using light incident upon them. Light can, in some embodiments, be passed through one or more lenses 412 before it reaches the sensors.

In various embodiments, the image data can include at least six color channels of information (e.g., RGB image data resulting from illumination with light source 402 during the forward scan and R'G'B' image data resulting from illumination with light source 404 in the reverse scan). Compared with the three color channels of image data that can be present in a scan using a single light source, the six channels comprise additional color information that can be used to improve the ability of color scan data to reproduce the original colors of a scanned object.

The light sources 402, 404 can each be configured to have different and particularized spectral frequency characteristics to enable enhanced color information in the scanned image of the object. It should be understood that embodiments of the present disclosure may be used in both reflective and transmissive scanning applications.

Accordingly, in various embodiments of the present disclosure, scanning an object in the forward direction can be performed using at least one light source emitting a characteristic first optical spectrum for illuminating the object. In some embodiments, emitting the characteristic first optical spectrum can be performed using a first lamp that emits a characteristic first set of at least three peak intensities.

In some embodiments, emitting the characteristic first optical spectrum can be performed using a first set of at least three light sources that each emits at least one characteristic peak intensity. In various embodiments, the first set of at least three light sources can include using at least LEDs that each emits at least one characteristic peak intensity.

In various embodiments, scanning the object in the reverse direction can be performed using at least one light source emitting a characteristic second optical spectrum for illuminating the object, where the characteristic second optical spectrum differs from the characteristic first optical spectrum. In some embodiments, emitting the characteristic second optical spectrum can be performed using a second lamp that emits a characteristic second set of at least three peak intensities, where the characteristic second set differs from the characteristic first set of at least three peak intensities.

In some embodiments, emitting the characteristic second optical spectrum can be performed using a second set of at least three light sources that each emits at least one characteristic peak intensity, where each of the characteristic peak intensities of the second set differs from characteristic peak intensities of a first set of at least three light sources. In various embodiments, the second set of at least three light sources can include using at least three LEDs that each emits at least one characteristic peak intensity.

In some of the embodiments of the present disclosure just described, the scan carriage can be associated with at least two light sources that each emits a characteristic optical spectrum for illuminating the object and a number of optical sensors for detecting light reflected from the object. As such, the scan carriage can include a first light source for illuminating the object, light reflected therefrom enabling capture of a first image, and a second light source for illuminating the object, light reflected therefrom enabling capture of a second image, where each light source emits a characteristic optical spectrum for illuminating the object.

Figure 5:
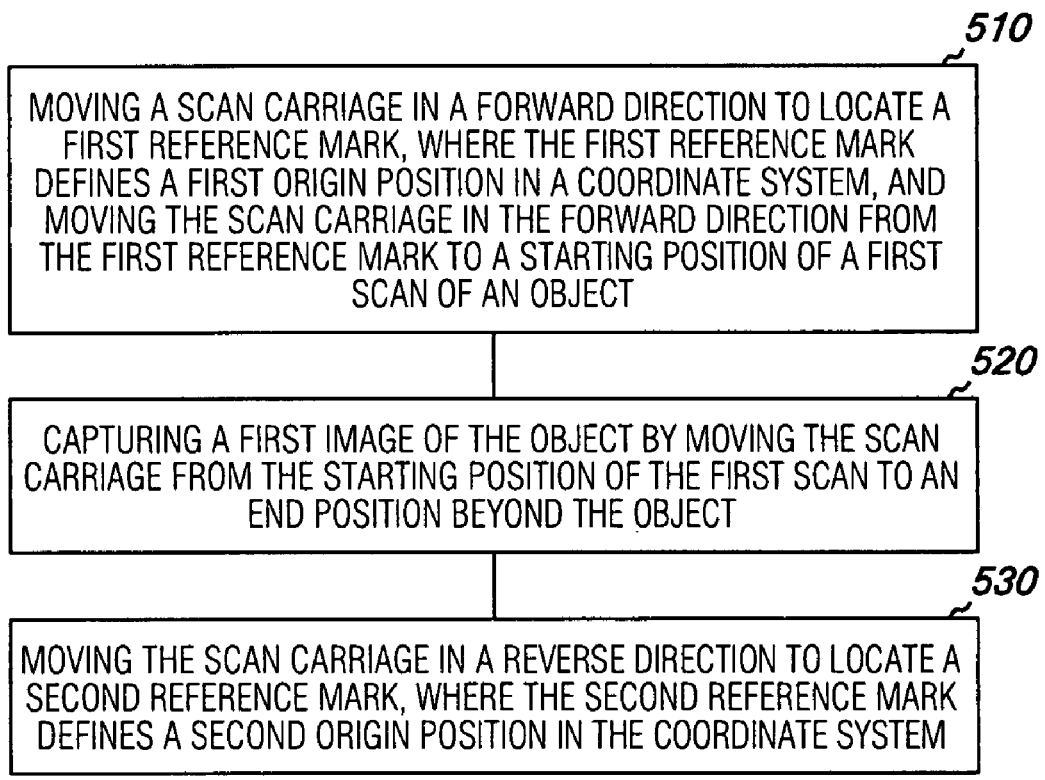
FIG. 5 is a block diagram illustrating a method of using two reference marks defining references of a coordinate system in aligning captured images of the same object according to an embodiment of the present disclosure.

FIG. 5 is a block diagram illustrating a method of using two reference marks defining references of a coordinate system in aligning captured images of the same object according to an embodiment of the present disclosure. Unless explicitly stated, method embodiments described herein are not constrained to a particular order or sequence. Additionally, some of the described method embodiments, or elements thereof, can occur or be performed at the same, or at substantially the same, point in time.

Embodiments described herein can be performed using logic, software, hardware, application modules, and/or ASICs, or combinations of these elements, and the like, to perform the operations described herein. Embodiments as described herein are not limited to any particular operating environment or to software written in a particular programming language.

The elements described can be resident on the systems, apparatuses, and/or devices shown herein, or otherwise. Logic suitable for performing embodiments of the present disclosure can be resident in one or more devices and/or locations. Processing devices used to execute operations described herein can include one or more individual modules that perform a number of functions, separate modules connected together, and/or independent modules.

The embodiment illustrated in FIG. 5 includes moving a scan carriage in a forward direction to locate a first reference mark, where the first reference mark defines a first reference position in a coordinate system, and moving the scan carriage in the forward direction from the first reference mark to a starting position of a first scan of an object, as shown in block 510. In some embodiments, movement of the scan carriage in the forward direction can, for example, begin from a first home position, located at a first end of the scan field, at which the scan carriage is positioned before and/or between scan operations, as illustrated in FIG. 3.

Block 520 of the embodiment shown in FIG. 5 includes capturing a first image of the object by moving the scan carriage from the starting position of the first scan to an end position beyond the object. In some embodiments, movement of the scan carriage to an end position beyond the object can, for example, include movement of the scan carriage to a second home position located at a second end of the scan field, as illustrated in FIG. 3.

As shown in block 530, the method includes moving the scan carriage in a reverse direction to locate a second reference mark, where the second reference mark defines a second reference position in the coordinate system. In some embodiments, the method can include moving the scan carriage in the reverse direction from the second reference mark to a starting position of a second scan of the object, capturing a second image of the object by moving the scan carriage from the starting position of the second scan to an end position beyond the first reference mark, and combining the first captured image of the object with the second captured image of the object to produce a single image.

Figure 6:
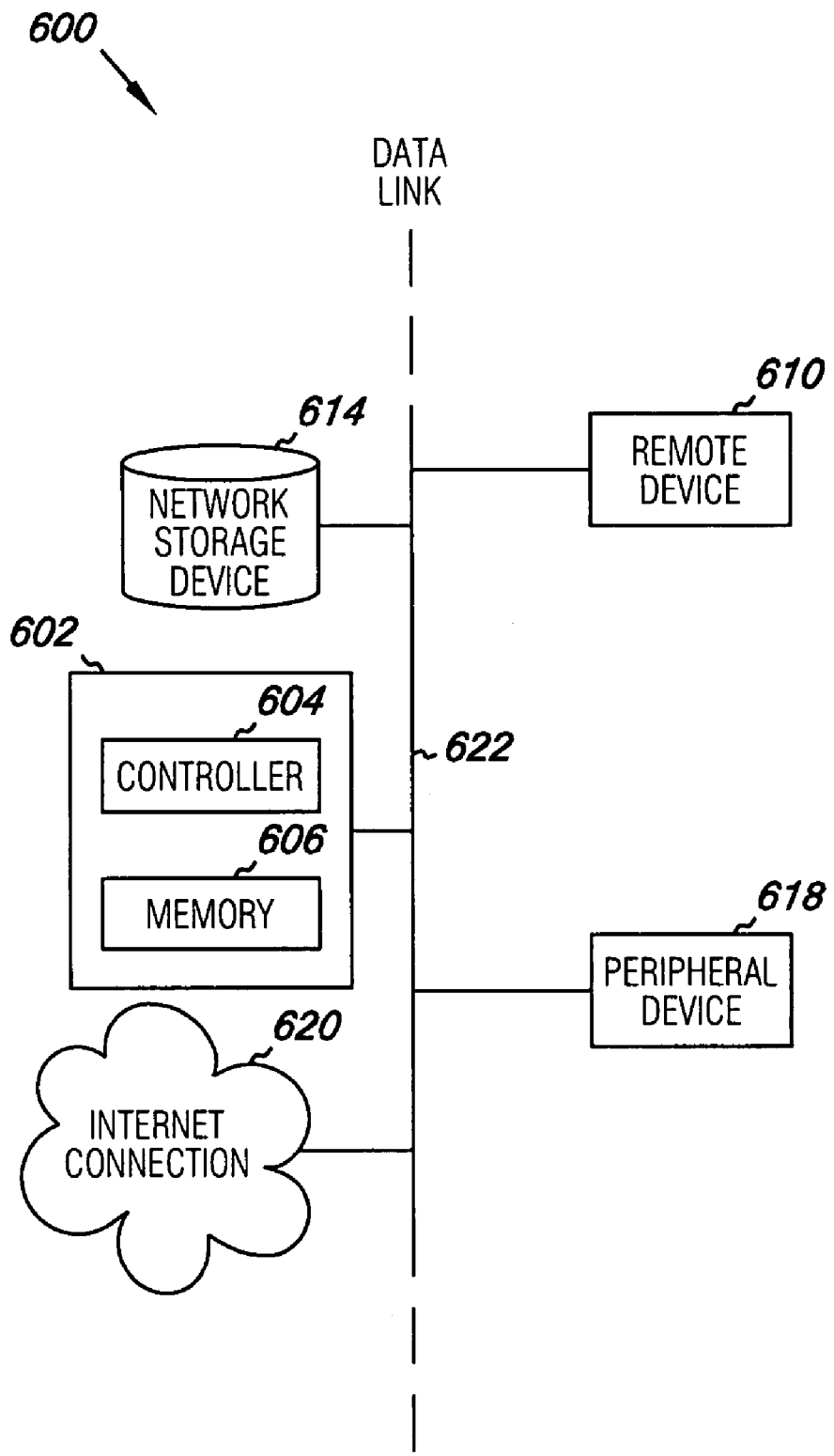
FIG. 6 illustrates a system suitable to implement embodiments of the present disclosure.

FIG. 6 illustrates a system suitable to implement embodiments of the present disclosure. FIG. 6 illustrates that a scanning apparatus, including embodiments described herein, can be incorporated as part of a system 600. As shown in FIG. 6, the system includes a scanning apparatus 602, such as a scanning apparatus as shown in FIG. 1.

The system 600 is operable to receive data and interpret the data from the scan of an object in a particular image position. The system 600 can include software, firmware, ASICs, and/or application modules thereon for receiving and interpreting data in order to perform the desired imaging functions. As one of ordinary skill in the art will appreciate, the software, firmware, ASICs, and/or application modules can be located on any device that is directly or indirectly connected to the scanning apparatus 602 within the system 600.

The scanning apparatus 602 can include a controller 604 and a memory device 606. The controller 604 and the one or more memory devices 606 can be operable to implement the method embodiments described herein. In various embodiments, the one or more memory devices 606 include storable memory on which data, including computer-executable instructions, and other information of the like, can reside.

As illustrated in the embodiment shown in FIG. 6, scanning apparatus 602 can be networked to one or more remote devices 610 over a number of data links, shown as 622. As one of ordinary skill in the art will appreciate upon reading this disclosure, the number of data links 622 can include one or more physical and/or one or more wireless connections as part of a network. That is, the scanning apparatus 602 and the one or more remote devices 610 can be directly and/or indirectly connected and can be connected as part of a wider network having a plurality of data links 622.

In various embodiments, a remote device 610 can include a device having a display perceivable by a user (e.g., a desktop computer, laptop computer, a workstation, hand held device, or any other such device as the same will be known and understood by one of ordinary skill in the art). The remote device 610 also can include one or more processors and/or application modules suitable for running software and/or one or more memory devices.

As illustrated in the embodiment shown in FIG. 6, a system 600 can include one or more networked storage devices 614 (e.g., a remote storage database and/or the like) networked to the system. Likewise, the system 600 can include one or more peripheral devices 618 and/or one or more Internet connections 620 distributed within the network.

As noted, the system embodiment 600 shown in FIG. 6 can include one or more peripheral devices 618. Peripheral devices can include any number of peripheral devices in addition to those already mentioned herein. Examples of peripheral devices can include, but are not limited to, one or more scanning apparatuses, faxing apparatuses, copying apparatuses, modem apparatuses, and the like.

The network described herein can include any number of network types including, but not limited to, a Local Area Network (LAN), a Wide Area Network (WAN), Personal Area Network (PAN), and the like. And, as stated above, data links 622 within such networks can include any combination of direct or indirect wired and/or wireless connections, including but not limited to electrical, optical, and/or RF connections.

Memory, such as memory 606 and memory 614, can be distributed anywhere throughout a networked system. Memory, as the same is used herein, can include any suitable memory for implementing the various embodiments of the present disclosure.

Thus, memory and memory devices can include fixed memory and portable memory. Examples of memory types can include non-volatile (NV) memory (e.g., Flash memory), RAM, ROM, magnetic media, and optically-read media, and can include such physical formats as memory cards, memory sticks, memory keys, CDs, DVDs, hard disks, and floppy disks, to name a few.

Software (e.g., computer readable instructions) can be stored on such memory media. Embodiments of the present disclosure, however, are not limited to any particular type of memory medium. In addition, embodiments of the present disclosure are not limited to where within a device and/or networked system a set of computer instructions is stored on memory for use in implementing the various embodiments described above.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure.

It is to be understood that the above description has been made in an illustrative fashion, and not a restrictive one. Combination of the above embodiments, and other embodiments not specifically described herein will be apparent to those of ordinary skill in the art upon reviewing the above description.

The scope of the various embodiments of the present disclosure includes other applications in which the above structures and methods can be used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method of image scanning, comprising:
   scanning an object in a forward direction and capturing a first image of the object;
   scanning the object in a reverse direction and capturing a second image of the object; and
   combining the first image and the second image to produce a single image,
   where combining the first and second image includes alining the first and second images using a location of a first reference mark and a location of a second reference mark in a coordinate system relative to a starting position of the forward direction scan and a starting position of the reverse direction scan.
   where scanning the object in the forward direction includes using at least one light source emitting a characteristic first optical spectrum for illuminating the object,
   where scanning (he object In the reverse direction includes using at least one light source emitting a characteristic second optical spectrum for illuminating the object, where the characteristic second optical spectrum differs from the characteristic first optical spectrum, and
   where emitting the characteristic second optical spectrum includes using a second lamp that emits a characteristic second set of at least three peak intensities, where the characteristic second set differs from a characteristic first set of at least three peak intensities.

2. The method of claim 1, where emitting the characteristic first optical spectrum includes using a first lamp that emits a characteristic first set of at least three peak intensities.

3. The method of claim 1, where emitting the characteristic first optical spectrum includes using a first set of at least three light sources that each emits at least one characteristic peak intensity.

4. The method of claim 3, where using the first set of at least three light sources includes using at least three light emitting diodes that each emits at least one characteristic peak intensity.

5. The method of claim 1, where emitting the characteristic second optical spectrum includes using a second set of at least three light sources that each emits at least one characteristic peak intensity, where each of the characteristic peak intensities of the second set differs from characteristic peak intensities of a first set of at least three light sources.

6. The method of claim 5, where using the second set of at least three light sources includes using at least three light emitting diodes that each emits at least one characteristic peak intensity.

7. A medium having executable instructions stored thereon for executing a method comprising:

moving a scan carriage in a forward direction to locate a first reference mark, where the first reference mark defines a first reference position in a coordinate system, and moving the scan carriage in the forward direction from the first reference mark to a starting position of a first scan of an object;

capturing a first image of the object by moving the scan carriage from the starting position of the first scan to an end position beyond the object; and moving the scan carriage in a reverse direction to locate a second reference mark, where the second reference mark defines a second reference position in the coordinate system;

moving the scan carriage in the reverse direction from the second reference mark, to a starting position of a second scan of the object;

capturing a second image of the object by moving the scan carriage from the starting position of the second scan to an end position beyond the first reference mark; and combining the first captured image of the object with the second captured image of the object to produce a single image, where combining the first and the second captured images includes using the executable instructions tor aligning the first and the second captured images using the location of the first reference mark and the location of the second reference mark in the coordinate system relative to the starting positions of the first and the second scans.

8. The non-transitory computer readable medium of claim 7, where the scan carriage includes using al least two light sources each emitting a characteristic optical spectrum for illuminating the object and a number of optical sensors for detecting light reflected from the object.

9. A scanning apparatus, comprising:

a scan carriage movable across a scan field in a forward direction from a first end to a second end and in a reverse direction from the second end to the first end;

a first reference mark located in a first defined position in association with the first end of the scan field and a second reference mark located in a second defined position in association with the second end of the scan field;

where the scan carriage includes the sensor to locate the second reference mark and is movable to capture a second image of the object starting at a starting position of a second scan of the inject while moving across the scan field in the reverse direction; and a processing device that aligns and combines data of the first and the second captured images by using the location of the first reference mark with respect to a location of the first image and the second reference mark with respect to a location of the second image in a defined coordinate system.

10. The apparatus of claim 9, where the scan carriage includes a first light source for illuminating the object light reflected therefrom enabling capture of the first image, and a second light source for illuminating the object, light reflected therefrom enabling capture of the second image, where each light source emits a characteristic optical spectrum for illuminating the object.

11. The apparatus of claim 9, where the apparatus includes a calibration marker in association with the first end of the scan field that is detectable by the sensor prior to capturing the first image of the object, the calibration marker being usable for calibrating parameters selected from a group including:

a lightness level in a captured image;

a darkness level in the captured image; and factors related to luminance, hue, and saturation of colors in the captured image.

* * * * *

UNITED STATES PATENT AND TRADEMARK OFFICE
CERTIFICATE OF CORRECTION

| | | |
|---|---|---|
| PATENT NO. | : 8,115,972 B2 | Page 1 of 1 |
| APPLICATION NO. | : 11/807869 | |
| DATED | : February 14, 2012 | |
| INVENTOR(S) | : Chingchu Huang | |

It is certified that error appears in the above-identified patent and that said Letters Patent is hereby corrected as shown below:

In column 12, lines 32-33, in Claim 1, delete "alining" and insert -- aligning --, therefor.

In column 12, line 37, in Claim 1, delete "scan." and insert -- scan, --, therefor.

In column 12, line 41, in Claim 1, delete "(he" and insert -- the --, therefor.

In column 12, line 41, in Claim 1, delete "In" and insert -- in --, therefor.

In column 12, line 52, in Claim 2, delete "a" and insert -- the --, therefor.

In column 13, line 5, in Claim 7, delete "A" and insert -- A non-transitory computer readable --, therefor.

In column 13, line 16, in Claim 7, after "object;" delete "and".

In column 13, line 31, in Claim 7, delete "tor" and insert -- for --, therefor.

In column 13, line 37, in Claim 8, delete "al" and insert -- at --, therefor.

In column 14, line 10, in Claim 9, below "scan field;" insert -- where the scan carriage includes a sensor to locate the first reference mark and is movable to capture a first image of an object starting at a starting position of a first scan of the object while moving across the scan field in the forward direction; --.

In column 14, line 13, in Claim 9, delete "inject" and insert -- object --, therefor.

In column 14, line 23, in Claim 10, delete "object" and insert -- object, -- therefor.

Signed and Sealed this
Sixteenth Day of October, 2012

David J. Kappos
*Director of the United States Patent and Trademark Office*